Patented July 15, 1941

2,249,017

UNITED STATES PATENT OFFICE 2,249,017

COATED WELDING ROD

Arthur R. Lytle, Niagara Falls, N. Y., and Thomas H. Vaughn, Trenton, Mich., assignors to Oxweld Acetylene Company, a corporation of West Virginia No Drawing. Original application May 13, 1938, Serial No. 207,778, now Patent No. 2,199,440, dated May 7, 1940. Divided and this application January 20, 1940, Serial No. 314,796

1 Claim. (Cl. 219—8)

This invention relates to welding rods for fusion deposition welding by electric arc and oxygen-gas methods. This application is a division of our application Serial No. 207,778, filed May 13, 1938, since matured into Patent No. 2,199,440 dated May 7, 1940.

The majority of fusion deposition welding operations involve the use, in addition to a welding rod and a source of heat, of a weld modifying substance, usually a solid in powdered or granular form. For instance, most of such operations require the use of inorganic fluxes to dissolve the metal oxides which otherwise would interfere with the production of a sound, strong weld. In gas welding procedures, the flux is usually applied by dipping the hot end of the welding rod into the flux, whereupon a small amount of flux adheres to the hot rod and is thereby conveyed to the welding puddle. This method of using flux has several disadvantages: it wastes flux and time, it is inconvenient, the supply of flux is uneven and frequently insufficient, and the weld is non-uniform in appearance and strength. Sometimes the flux is made into a paste with water and applied to the entire rod, and sometimes the entire rod is heated and rolled in flux to produce a rough and uneven coating; but these expedients do not provide a strong, adherent, uniform coating which will withstand handling or shipment. Arc welding electrodes are usually coated with a flux held in place with a fabric or a binder such as sodium silicate.

A practice that is increasing in popularity is to introduce alloying elements into the weld by coating a ductile metal welding rod with comminuted metals or alloys. In this manner such elements as chromium, tungsten, manganese, and silicon may be added to the weld puddle. Sometimes a mixture of a reducible compound of the desired metal with a reducing agent is used instead of the metal itself. Such coatings frequently contain, also, cleansing, scavenging, and deoxidizing agents. The types of materials discussed above are hereinafter referred to collectively as weld modifying substances.

The problem of providing a wholly satisfactory coating of weld modifying substances on a welding rod, for either electric arc or gas welding, is primarily a problem of providing a suitable binder. The binder must either completely disappear during welding without adversely affecting the welding or leaving a charred residue or producing smoke, fume, or disagreeable odor, or else float freely on the surface of the molten weld metal so as not to leave surface flaws in the completed weld. Furthermore, the binder must not interfere with the action of the flux; it must cling tenaciously to the welding rod despite rough handling and wide changes in temperature; it must be flexible, tough, and water resistant; it must not lose its toughness or adherence during storage or moderate exposure to weathering; and it must be capable of binding the desired amount of material to the rod. If the rod is to be used for arc welding, the binder must not adversely affect arc stability. We have tested numerous binding materials, both organic and inorganic, and have found that most materials fail to meet one or more of these requirements.

We have discovered that rubber hydrochloride may be used successfully as a binder for coating welding rods with solid weld modifying substances. The invention accordingly includes a welding rod comprising a metal core provided with a coating essentially including at least one comminuted solid weld modifying substance and a binder of rubber hydrochloride.

Coatings according to our invention may be prepared and applied to welding rods in a number of ways. For example, a rod coated with weld modifying substance may be covered with a film of the rubber derivative, or the rod may be dipped into a mixture of weld modifying substance with a solution of the rubber derivative in a suitable solvent and the solvent then evaporated; or a paste of the rubber derivative, a solvent, and a weld modifying substance may be prepared and applied to the rod by brushing or dipping; or, preferably, a mixture of thermoplastic rubber derivative, solvent, and weld modifying substance is extruded over the rods. The following specific example includes a procedure typical of those which we have employed successfully, but our invention is not limited to this example. In the example, proportions are given in parts by weight.

*Example.*—Bronze welding rods were coated with a powdered flux mixture, consisting of 18 parts of fused borax and 82 parts of boric acid, by warming the rods and rolling them in the powdered mixture. The still warm coated rods were then spirally wrapped with ribbons of self-sealing thermoplastic rubber hydrochloride (marketed under the trade name "Pliofilm". The coated rods had satisfactory welding properties.

Welding rods treated according to our invention have numerous advantages over the method heretofore used of applying flux to the weld by dipping the hot, uncoated welding rod into a supply of flux. The use of rods coated with flux is more convenient, faster, and provides welds of a uniform appearance and of uniform and improved physical properties.

We claim:

Welding rod comprising a metal core and an adherent coating thereon, such coating comprising a solid weld modifying substance and a thermoplastic rubber hydrochloride characterized by the fact that when the rod is used for welding substantially no charred residue and substantially no disagreeable fumes are produced.

ARTHUR R. LYTLE.
THOMAS H. VAUGHN.